UNITED STATES PATENT OFFICE.

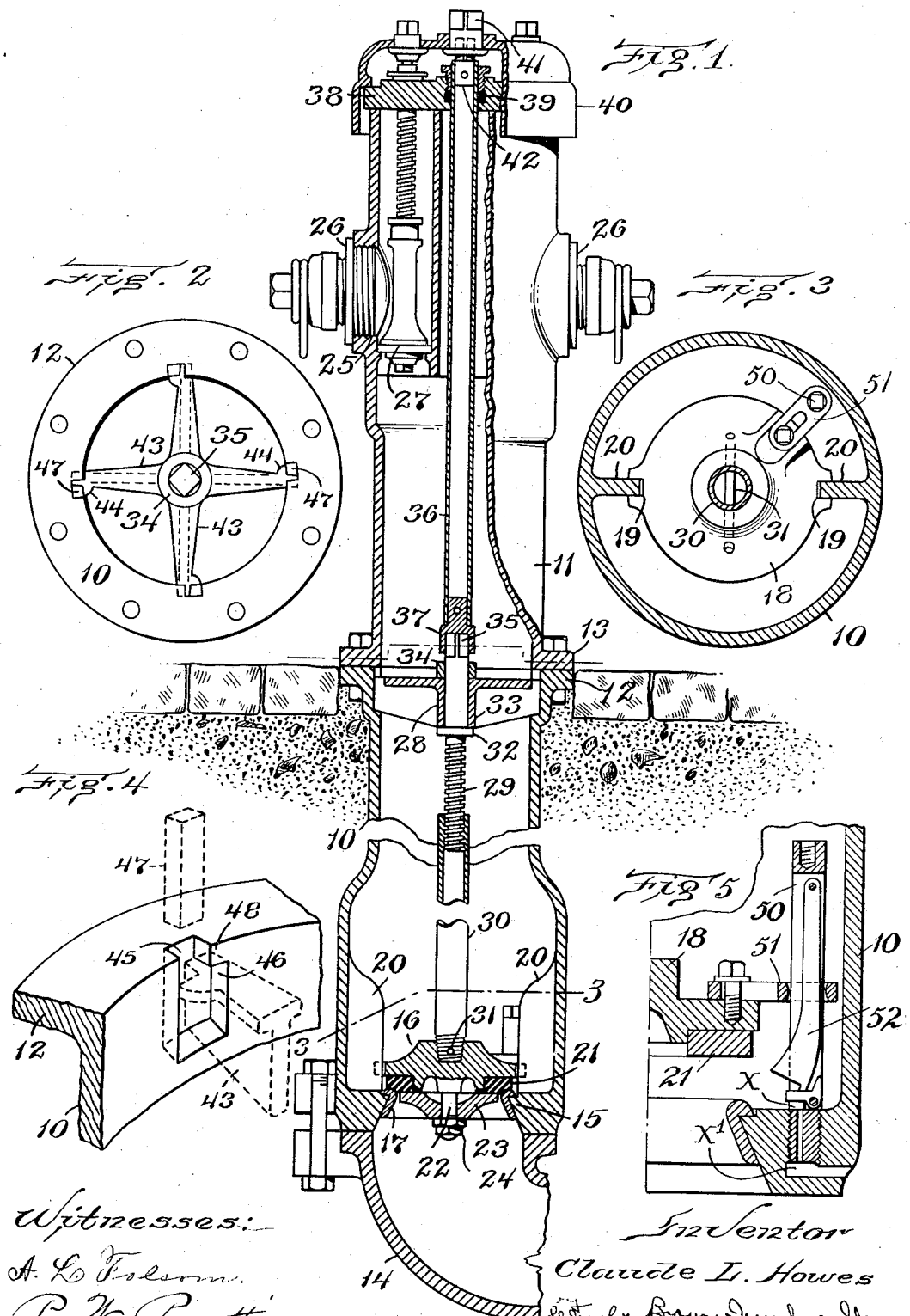

CLAUDE L. HOWES, OF BOSTON, MASSACHUSETTS.

STREET FIRE-HYDRANT.

1,037,914.　　　Specification of Letters Patent.　　Patented Sept. 10, 1912.

Application filed February 7, 1908, Serial No. 414,730. Renewed January 18, 1911. Serial No. 603,402.

*To all whom it may concern:*

Be it known that I, CLAUDE L. HOWES, of Boston, in the county of Suffolk and State of Massachusetts, have invented certain new and useful Improvements in Street Fire-Hydrants, of which the following is a specification.

This invention has relation to street or fire hydrants of the compression valve type in which the main valve is seated against the pressure of the water.

The invention has for its object to provide a fire hydrant with means for holding the main valve to its seat in the event of breakage and consequently displacement of the exposed portion of the hydrant casing and its adjuncts, thereby preventing waste of water.

In carrying out my invention I construct the hydrant casing in two portions, one to be sunk below the level of the ground and the other to project above the ground and to be provided with the separate outlet valves. The lower portion is provided with the main valve seat and the valve spindle is braced against said lower portion, and is operated by a spindle extension which is accessible at the head of the exposed portion. In this way, even though the exposed portion of the casing should be broken completely off, carrying with it the spindle extension, the main valve would be held firmly against its seat. I have also provided against a possible leakage of water past the main valve, by making the valve of one continuous or unperforated piece of metal, so that, when the gasket thereon is seated tightly against the seat, no escape of water through the valve is possible. In this case the gasket is secured in place by a washer centered on a stud projecting from the valve, and pressed against the gasket by a nut threaded on said stud.

On the accompanying drawings, Figure 1 illustrates, partially in section, a street fire hydrant embodying my improvements. Fig. 2 illustrates the upper end of the lower portion or section of the casing with the spider for receiving the spindle. Fig. 3 represents a section on the line 3—3 of Fig. 1. Fig. 4 illustrates one of the sockets formed in the casing to receive the spider. Fig. 5 represents a vertical section of a portion of the hydrant casing, the main valve therefor and the waste valve.

On the accompanying drawings, the hydrant is illustrated as comprising a casing or barrel consisting of a lower portion or section 10 and an upper portion or section 11. These two sections have at their meeting ends, opposing flanges 12, 13 which are securely bolted and clamped together. The lower section 10 is embedded in the earth as illustrated, whereas the upper section 11 extends upwardly from the level of the ground so that the two sections may be referred to as the "concealed" section and the "exposed" section. The lower section is at its lower end attached by suitable means to the water main which is indicated at 14, and it is formed with an inwardly projecting annular flange 15 in which is placed a seat 17 for the main valve which is indicated as a whole at 16.

The main valve 16, as illustrated, consists of an unperforated plate 18 with diametrically opposite notches 19 to receive the guide flanges 20 which project inwardly from the concealed section of the barrel. The plate 18 is rabbeted to receive an annular gasket 21. Formed integrally with the plate and depending axially therefrom, is a threaded stud 22 which centers a washer 23, which is forced by nuts 24 against the gasket so as to clamp it securely in place. The valve which as stated before is of the compression type, is raised and lowered by valve-operating means which I will subsequently describe.

The exposed portion of the barrel or casing, as illustrated in Letters Patent No. 733,483, granted to me July 14/03 is provided with a plurality of threaded apertures 25 normally closed by screw plugs 26. There is a plurality of separate valves 27 arranged in different compartments, communicating with the said apertures 25, so that, when these valves are opened, water may be discharged through the several apertures or ports 25.

Substantially at the junction of the two portions of the casing, there is an abutment with which the valve spindle for the main valve is engaged and which resists the pressure of the water against said main valve when the latter is closed. This abutment I have illustrated as consisting of a spider 28. The main valve spindle consists of two sections 29 and 30. The latter is preferably tubular and its lower end is threaded into a socket in the upper face of the valve plate 18, and is held in place by a pin 31. The upper end of this tube is internally threaded so as to receive the portion 29 of the spindle, the lower portion of which is in the form of a screw bar. The said upper portion 29 has a collar 32 bearing against the hub 33 of the spider. Said portion 29 of the spindle projects through the hub of the spider, and it has secured upon it a collar 34. The extremity of the upper projecting portion is square as illustrated at 35. Projecting upwardly through the exposed section of the barrel is a spindle extension which consists of a tube 36 having secured to its lower end a socket piece 37 into which projects the angular end of the valve spindle so that, when the spindle extension is rotated, the screw bar is rotated to open or close the valve. The spindle extension projects upwardly through the top or head 38 of the barrel and passes through a suitable stuffing box 39. The hood 40 of the barrel is provided with an angular member 41 which is socketed to receive a plug 42 inserted in the upper end of the tube 36, so that by rotating said member 41, the spindle extension may be rotated likewise.

From this construction, it will be seen that should the exposed portion of the barrel receive a heavy shock as for instance, being struck by a heavily laden dray, it will, if it breaks, break above the flanges 12 and 13, but that the spider will be undisturbed and will continue to resist the thrust of the valve due to the pressure of the water in the main. Thus the entire exposed portion of the barrel may be broken off without permitting a wastage of the water. It is evident that the spider might be formed integrally with the lower portion of the barrel, but for convenience, it is formed separately. It could well be clamped between the two abutting ends of the exposed and concealed portions of the barrel though I have shown it as being removably connected with the upper end of the concealed section.

The spider has the radial arms 43 with lateral lugs 44 for a purpose to be described. At its upper end, the concealed section of the barrel has diametrical interior slots 45, each of which has an off-set portion 46 similar to the slot of a bayonet joint. The ends of the arms 43 are dropped into the slots 45 and the spider is partially rotated until the ends of said arms are located in the portions 46 of said slots, after which blocks 47 are dropped into the open portions of the slots so as to lock the spider against reverse rotation. The blocks 47 are held against inward movement by the lugs 44 and against upward movement by the lower end of the exposed section of the barrel. The wall or lug 48 which is located above the portion 46 of each slot, resists the upward thrust of the spider.

When the upper exposed portion of the barrel is removed, the spindle extension is slipped off from the end of the valve spindle, since it has merely a telescopic connection therewith.

The arms of the spider are arranged radially, with special relation to a waste valve with which the lower section is provided. In Figs. 1 and 3 is represented a holder 50 for a waste valve $x$ which is substantially the same as that illustrated and described in my co-pending application, Serial No. 377,140, filed June 4, 1907. The holder 50 is screw-threaded in the lower section, and it contains a waste valve which controls a waste passage $x'$. The valve member 18 carries a member 51 which is adapted to slide up and down upon the holder 50, and engage and swing a member 52 which opens and closes the waste valve. By a comparison of Figs. 2 and 3 it will be observed that the radial position of the holder 50 with reference to the axis of the barrel is in a vertical plane midway between two adjacent arms 43 of the spider. The spider is purposely fitted into the lower section in this relation in order to leave an unobstructed space through which a tool may be inserted vertically to engage the holder 50 so that the holder may be inserted and removed without disturbing the main valve and the spider.

In case the main valve is removed for any purpose, the member 51 may be freely detached from the holder 50 by vertical movement, without disturbing the holder. It is obvious that either the main valve or the waste valve holder may be detached without in any way disturbing the other.

I desire to have it understood that the invention is capable of other embodiments from that illustrated and described and is therefore not to be limited to the details of construction which I have set forth.

Having thus explained the nature of my said invention and described a way of constructing and using the same, although without attempting to set forth all of the forms in which it may be made or all of the modes of its use, I declare that what I claim is:—

1. In a street fire hydrant, a barrel consisting of an upper exposed section and a lower concealed section, suitably connected at their meeting ends, said lower section having offset slots, a valve seat in the lower section, a valve movable in the lower section, a valve spindle, a spider as an abutment for the spindle and having arms removably arranged in said slots, and keys constructed to enter said slots for locking said arms therein.

2. In a street fire hydrant, a barrel consisting of an upper exposed section and a lower concealed section, suitably connected at their meeting ends, said lower section having slots, a valve seat in the lower section, a valve movable in the lower section, a valve spindle, a spider having arms arranged in said slots and coöperating with said spindle as an abutment therefor, locking members arranged in said slots for confining the arms of the spider, and means on the arms for confining the locking members.

3. In a street fire hydrant, a barrel consisting of an upper exposed section, and a lower concealed section, suitably connected at their meetings ends, a valve arranged in the lower section, a valve seat therefor in the lower section below the valve, said lower section having substantially radial interior surfaces extending downwardly from its upper end, and seats facing upwardly at the lower ends of said surfaces, a removable abutment having extremities adapted to rest upon said seats, said lower section having pockets into which said extremities may be moved rotatively about the axis of the barrel, and shoulders for engaging the upper side of said extremities for preventing upward movement in said pockets, removable members adapted to rest upon said seats between said extremities and radial surfaces to keep said extremities in said pockets, and a valve spindle for operating said valve, said spindle engaging an under face of said abutment whereby it is adapted to hold the valve positively against its seat.

4. In a street hydrant, a barrel consisting of an upper exposed section, and a lower concealed section, suitably connected at their meeting ends, said lower section having a main valve seat and a waste passage, a main valve in said lower section above said seat, a spindle for said main valve, a waste valve, a holder for the waste valve, said holder having screw-threaded connection with the lower section, means operated by the main valve for opening and closing the waste valve, and a detachable spider having interlocking connection with the lower section above the main valve, said spider being an abutment engaging said main-valve spindle to hold the main valve upon its seat, said spider being arranged to leave an unobstructed space in the vertical plane of said waste valve holder, whereby a suitable tool may be inserted between the arms of the spider for inserting and removing the waste valve holder without disturbing the main valve and the spider.

In testimony whereof I have affixed my signature, in presence of two witnesses.

CLAUDE L. HOWES.

Witnesses:
M. B. MAY,
P. W. PEZZETTI.